Patented Mar. 27, 1923.

1,449,380

UNITED STATES PATENT OFFICE.

MICHEL TEODOR CALLIMACHI, OF LONDON, ENGLAND, ASSIGNOR TO COURTAULDS LIMITED, OF LONDON, ENGLAND.

MANUFACTURE OF THREADS, FILAMENTS, STRIPS, OR FILMS OF CELLULOSE.

No Drawing. Application filed March 31, 1922. Serial No. 548,477.

*To all whom it may concern:*

Be it known that I, MICHEL TEODOR CALLIMACHI, a subject of the King of Roumania, residing at 28 Hamilton Terrace, in the county of London, England, have invented new and useful Improvements in or Connected with the Manufacture of Threads, Filaments, Strips, or Films of Cellulose, of which the following is a specification.

This invention relates to the manufacture of threads, filaments, strips, or films, of cellulose, by projecting viscose from suitably shaped orifices into a setting bath. In the specification of Letters Patent No. 21,405 A. D. 1907 it is stated that the addition of glucose, or other sugar, to a setting bath containing a mineral acid, such as sulphuric acid, improves the quality, and in particular the pliability, of the product obtained.

According to the present invention instead of using glucose, or other sugar, use is made of a solution, or mixture, obtained by dissolving starch, or starchy matter, in sulphuric acid. By projecting viscose for instance, into a bath containing sulphuric acid and such a solution or mixture, obtained from starch and sulphuric acid, better results can be obtained than those which are produced in using the bath not containing the said starch solution, or mixture. Also, the starch, or starchy matter, used according to this invention is much cheaper than the glucose, or other sugar, previously employed.

Ordinary air-dry starch contains about 18 per cent of its weight of water and when mixed with fairly concentrated sulphuric acid (containing say 60 per cent $H_2SO_4$) under ordinary conditions, the starch gelatinizes and forms lumps, which cannot, or only with great difficulty can, be mixed with sulphuric acid, so as to yield a homogeneous mixture. I have found that this difficulty can be overcome by previously drying, or reducing the moisture content of, the starch, or starchy matter, say from 18 per cent to 5 per cent or less, preferably at a comparatively low temperature under reduced pressure so as to avoid gelatinization, and if the said dried starch, or starchy matter, be added rapidly with continuous stirring to sulphuric acid which has previously been cooled below zero centigrade. Under these conditions the starch, or starchy matter, and sulphuric acid can be thoroughly and rapidly mixed and when allowed to stand the starch dissolves giving a yellow, and practically transparent, solution.

The solution thus obtained can be employed for the preparation of the setting bath by dilution with water and the addition of sulphuric acid, if necessary. For instance, solutions suitable for the preparation of setting baths according to this invention are obtained as described in the following examples which will explain how this invention can be performed, but I do not limit myself to these examples. The parts are by weight.

*Example 1.*

58 parts of potato starch containing not more than 5 per cent of water are added rapidly and with continous stirring to 100 parts of sulphuric acid containing 62 per cent $H_2SO_4$ and at a temperature of 0° centigrade to —5° centigrade. When a homogeneous mixture has been obtained, the liquid is run out of the mixer and allowed to warm up, when the starch rapidly dissolves giving a pale yellow solution which may be stored for some days until required, or diluted as soon as solution of the starch is complete.

*Example 2.*

58 parts of dry maize starch are thoroughly mixed with 90 parts of sulphuric acid containing 55 per. cent. $H_2SO_4$ which has been previously cooled to —5° centigrade. The mixture is allowed to warm up spontaneously and when the starch has dissolved, 12.5 parts of pure sulphuric acid and 540 parts of water are added.

Other suitable ingredients can also be added to the aforesaid setting bath, without departing from the nature of this invention; such, for instance, as sodium sulphate, the use of which is described in the specification of Letters Patent No. 10,094 A. D. 1906, or ammonium sulphate, or magnesium sulphate, the use of which is described in the specification of Letters Patent No. 5,595 A. D. 1908, or a zinc salt, the use of which is described in the specification of Letters Patent No. 406 A. D. 1911.

What I claim is:—

1. For use in the manufacture of threads, filaments, strips or films from viscose, a setting bath containing starchy matter dissolved in sulphuric acid.

2. For use in the manufacture of threads, filaments, strips or films from viscose, a setting bath containing dried starchy matter dissolved in sulphuric acid pre-cooled below zero C.

3. For use in the manufacture of threads, filaments, strips or films from viscose, a setting bath comprising starchy matter dissolved in sulphuric acid, to which, in diluted condition, a soluble sulphate is added.

In testimony whereof I have signed my name to this specification in the presence of two subscribing witnesses.

MICHEL TEODOR CALLIMACHI.

Witnesses:
R. E. SAGAR,
ALFRED L. CANON.